United States Patent
Andersson

(10) Patent No.: US 6,780,270 B2
(45) Date of Patent: Aug. 24, 2004

(54) METHOD AND DEVICE FOR WEB FOR EMBOSSING AND PRINTING A WEB OF FLEXIBLE MATERIAL, SUCH AS PAPER AND NONWOVEN, AND A WEB MATERIAL PRODUCED BY THE METHOD

(75) Inventor: Anders Andersson, Stenungsund (SE)

(73) Assignee: SCA Hygiene Products AB, Gothenburg (SE)

(*) Notice: Subject to any disclaimer, the term of this patent is extended or adjusted under 35 U.S.C. 154(b) by 6 days.

(21) Appl. No.: 10/271,721

(22) Filed: Oct. 17, 2002

(65) Prior Publication Data

US 2003/0072918 A1 Apr. 17, 2003

Related U.S. Application Data

(60) Provisional application No. 60/329,522, filed on Oct. 17, 2001.

(51) Int. Cl.[7] ............................... B31F 1/20; B31F 1/07; B32B 31/00
(52) U.S. Cl. ..................... 156/209; 156/277; 101/32
(58) Field of Search .......................... 156/209, 277, 156/292; 162/109, 112, 113; 101/23, 32

(56) References Cited

U.S. PATENT DOCUMENTS

| | | |
|---|---|---|
| 3,024,154 A | 3/1962 | Singleton et al. |
| 3,867,225 A | 2/1975 | Nystrand |
| 5,339,730 A | 8/1994 | Ruppel et al. |
| 5,622,106 A * | 4/1997 | Rayner ........................ 101/32 |

FOREIGN PATENT DOCUMENTS

| | | |
|---|---|---|
| EP | 0 414 015 A2 | 2/1991 |
| EP | 0 684 132 A1 | 11/1995 |
| EP | 0 738 588 A1 | 10/1996 |

* cited by examiner

*Primary Examiner*—Donald J. Loney
(74) *Attorney, Agent, or Firm*—Young & Thompson

(57) ABSTRACT

A web of flexible material, such as paper and nonwoven material is embossed by printing the web in a selected pattern by bringing it into a first nip between an impression roll and a printing roll carrying a colorant in a selected pattern; subsequently embossing the web by bringing it into a second nip between a pattern roll and the impression roll, the pattern roll having a three dimensional pattern of alternating raised and recessed portions, the three dimensional pattern being interrupted by relatively smooth areas, so that the web will be embossed in selected areas while leaving other areas substantially unembossed; the pattern roll and printing roll being synchronized so that embossing occurs mainly in the areas of web that are not printed in the selected pattern. The printing and embossing steps may also be reversed so that the web is embossed before printing.

12 Claims, 3 Drawing Sheets

METHOD AND DEVICE FOR WEB FOR EMBOSSING AND PRINTING A WEB OF FLEXIBLE MATERIAL, SUCH AS PAPER AND NONWOVEN, AND A WEB MATERIAL PRODUCED BY THE METHOD

TECHNICAL FIELD

The present invention refers to a method and a device for embossing and printing a web of flexible material, such as paper and nonwoven material. Especially it refers to production of tissue products such as toilet and kitchen paper, paper towels, handkerchiefs, wiping material and the like. The invention further refers to an embossed and printed web of flexible material, such as paper and nonwoven.

BACKGROUND OF THE INVENTION

It is common to emboss and print tissue products. Embossing is a way of increasing the bulk of the paper and it also gives a three-dimensional structure to the paper, which improves the absorption properties and also the aesthetic appearance of the tissue product. Embossing may further be a way of laminating two or more tissue paper plies together, at which a mechanical joining of the plies occur in the embossing sites. Embossing is often combined with gluing for laminating tissue paper plies. This is for example disclosed in U.S. Pat. No. 3,414,459, in which laminating of tissue plies by a combined embossing and gluing procedure is shown. The embossing is of so called foot-to-foot type according to which the raised protuberances of the embossed tissue plies are joined together. In U.S. Pat. No. 3,867,225 there is also disclosed a combined embossing and gluing process, but where the embossing is of so called nested type according to which the raised projections of one tissue ply will rest in and be joined to the depressions of the opposite ply.

Printing of tissue paper is often made for aesthetical reasons. The printing pattern could be any pattern including more or less continuous lines, line segments, dots, trademarks, logotypes, symbols, fantasy characters etc. One conventional way of embossing and printing a tissue paper is to perform the embossing first and subsequently the printing. This method will result in that the printing colorant will be located substantially only on the raised projections of the embossing pattern. An example of such method is found in U.S. Pat. No. 5,339,730.

According to an alternative method the printing of one tissue ply is made first and subsequently this tissue ply is embossed and laminated with another tissue ply. A drawback with such a method is that the colorant is not always completely dry before the embossing, which means a risk that the printing will be blurred.

In both these methods there is a risk that the embossing deteriorate the quality of the printing.

SUMMARY OF THE INVENTION

The object of the present invention is to provide a method for producing a printed and embossed web of flexible material, such as paper and nonwoven material of an improved quality especially printing quality. According to one embodiment the invention refers to printed and embossed tissue paper, which may be a one-ply or multi-ply tissue product.

This object has according to one embodiment of the invention been provided by embossing the web by bringing it into a first nip between a pattern roll and an impression roll, said pattern roll having a three dimensional pattern of alternating raised and recessed portions, said three dimensional pattern being interrupted by substantially smooth areas, so that the web will be embossed in selected areas while leaving other areas substantially unembossed; subsequently bringing the web into a second nip between said impression roll and a printing roll carrying a colorant in a selected pattern, said pattern roll and printing roll are synchronized so that said colorant is transferred at least mainly to unembossed areas of the web in said selected pattern.

According to an alternative embodiment of the invention the method comprises: printing the web in a selected pattern by bringing it into a first nip between an impression roll and a printing roll carrying a colorant in the selected pattern; subsequently embossing the web by bringing it into a second nip between a pattern roll and an impression roll, said pattern roll having a three dimensional pattern of alternating raised and recessed portions, said three dimensional pattern being interrupted by substantially smooth areas, so that the web will be embossed in selected areas while leaving other areas substantially unembossed; said pattern roll and printing roll are synchronized so that embossing occurs at least mainly in the areas of the web that are not printed in said selected pattern.

The web that undergoes the embossing and printing steps can be a one-ply or a multi-ply material. The multi-ply web can be a laminated web in which plies have been joined by for example by gluing and/or embossing. The multi-ply web can alternatively comprise two or more plies which have not been joined, and which will be joined together by the embossing step and an optional subsequent gluing step or the like.

According to a preferred embodiment the pattern roll is of a harder material than the impression roll, which is of a non-rigid material, so that the three dimensional pattern on the pattern roll will cause temporary or permanent impressions in the surface of the impression roll.

The non-embossed areas of the web entering the second press nip will present raised areas with respect to the printing roll adapted to receive the colorant in said selected printing pattern, while said impression roll serves as a counter roll during the printing.

The invention further refers to a device for embossing and printing a web of flexible material, such as paper and nonwoven material, said device comprising an embossing roll having a three dimensional pattern of alternating raised and recessed portions, said three dimensional pattern being interrupted by relatively smooth areas; a printing roll adapted to carry a colorant in selected pattern, said embossing roll and said printing roll being synchronized, an impression roll cooperating with the embossing roll and the printing roll.

In addition the invention refers to a printed and embossed web of flexible material, such as a paper and nonwoven, wherein the web is embossed in selected areas and that other areas are relatively smooth and non-embossed and that the web is printed in a selected pattern at least mainly in said smooth and non-embossed areas.

According to one embodiment at least 50% of the printed area of said selected printing pattern is located on the non-embossed areas of the web. According to further embodiments at least 75% and preferably at least 90% of the printed area of said selected printing pattern is located on the smooth non-embossed portions of the web. According to an additional embodiment substantially all printed area of said selected printing pattern is located on the smooth non-embossed portions of the web.

In a preferred embodiment said selected embossed areas are arranged as groups of embossment sites having said substantially smooth and unembossed areas between said groups of embossment sites, and that at least some of said smooth and unembossed areas have an uninterrupted surface area of at least 1 cm$^2$, preferably at least 1.5 cm$^2$ and more preferably at least 2 cm$^2$ having no embossment sites thereon.

The paper web may in one embodiment besides said selected printing pattern be provided with other printing patterns optionally configured on the paper web.

The web of material is according to one embodiment tissue paper, which may be one-ply or multi-ply tissue product.

Further features of the invention are disclosed in the following description and in the claims.

BRIEF DESCRIPTION OF THE DRAWINGS

The invention will in the following be closer described with reference to some embodiments shown in the accompanying drawings.

DETAILED DESCRIPTION OF THE INVENTION

Figure 1:
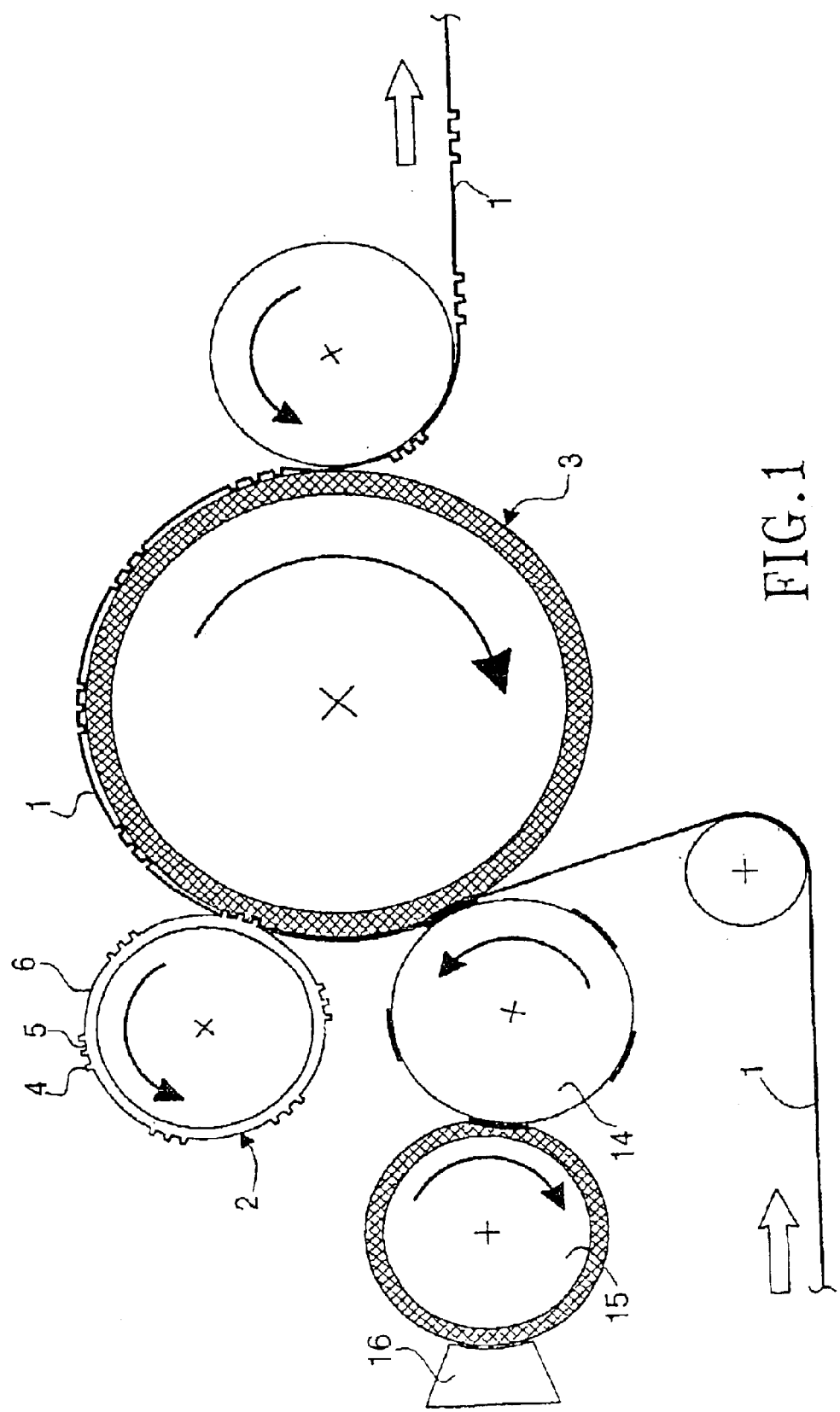
FIG. 1 shows a schematic side view of a device for performing the method according to one embodiment of the invention.

FIG. 1 shows a device for producing a web material, e g paper, especially tissue paper.

The web can be a one-ply or a multi-ply material. The multi-ply web can be a laminated web in which the plies have been joined by for example by gluing and/or embossing. The multi-ply web can alternatively comprising two or more plies which have not yet been joined.

The web 1 is brought into a first nip between the impression roll 3 and a printing roll 14 carrying a colorant in a selected pattern. The printing roll 14 is according to one embodiment a so called block-printing roll. Non-limiting examples of such block-printing rolls are laser-engraved solid or sleeve rubber rolls. Colorant is transferred to the printing roll 14 via an anilox roll 15, which picks up colorant from an enclosed doctor chamber 16 for ink.

The printing pattern 10 is optional and can be geometrical patterns, figurative patterns, symbols, text, trade names, logotypes etc.

The web 1 is subsequently fed into a second nip between a pattern roll 2 and an impression roll 3. The pattern roll 2 has a three dimensional pattern of alternating raised 4 and recessed portions 5, said three dimensional pattern being interrupted by relatively smooth areas 6. The pattern roll 2 is of harder material than the impression roll 3, which is of a non-rigid material. The impression roll 3 can be of a resilient rubber material or of a yielding but non-resilient material, for example a cellulosic material, in which permanent impressions will be formed by the impression roll 3. The pattern roll 2 can be of steel or of a rubber material that is harder than the material in the impression roll so that the three dimensional pattern on the pattern roll will cause temporary or permanent impressions in the surface of the impression roll.

Figure 3:
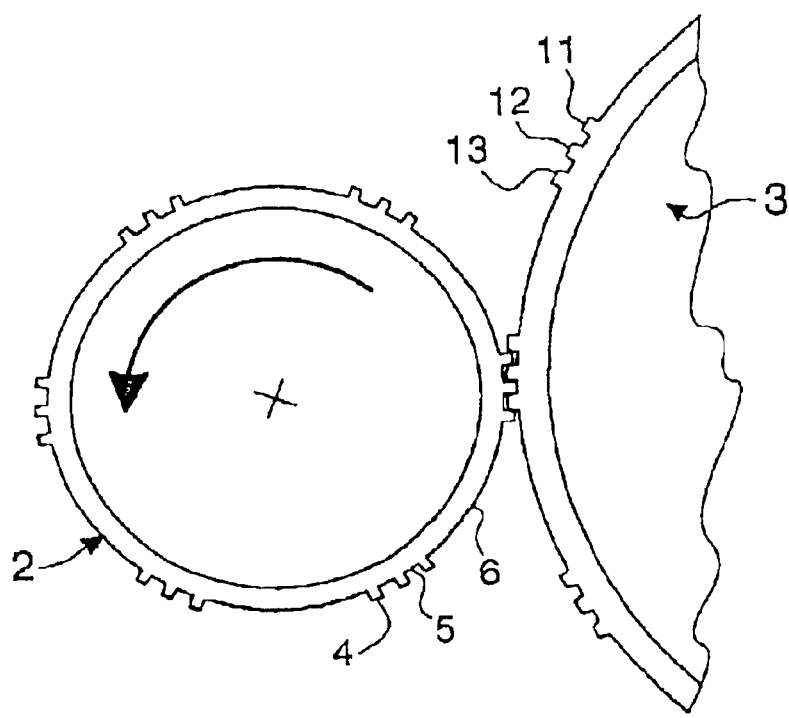
FIG. 3 shows a schematic view of a detailed of an alternative embodiment of a device according to the present invention.
Figure 4:
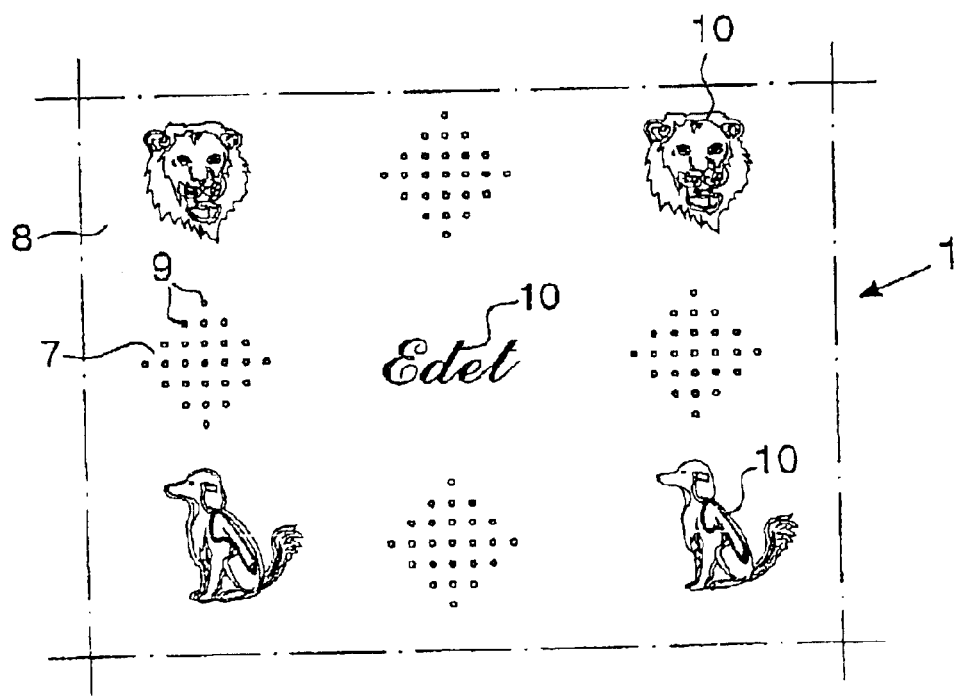
FIG. 4 is a schematic view of a web material according to the invention.

According to an alternative embodiment, illustrated in FIG. 3, the impression roll 3 is of a rigid material, for example steel, and has a three-dimensional pattern of alternating raised 11 and recessed portions 12, said three dimensional pattern being interrupted by relatively smooth areas 13 the three-dimensional pattern on the impression roll 3 matching to that of a pattern roll 2. The pattern roll 2 and impression rolls 3 are driven so that the alternating raised and recessed portions patterns thereon will match into each other and the relatively smooth areas will be facing each other.

The term relatively smooth in this respect means that these areas of the pattern roll either lack a three-dimensional pattern of alternating raised and recessed portions that will cause a visible embossing pattern in the web, or that these areas have only a slight three-dimensional pattern that is much less pronounced than said three-dimensional pattern of alternating raised and recessed portions.

As stated above the three-dimensional pattern on the pattern roll 2 is interrupted by relatively smooth areas 6, which means that the web 1 will be embossed in selected areas 7 while leaving other areas 8 substantially non-embossed. The embossing pattern is optional and is characterized by a number of embossing sites 9 arranged in groups which are spaced from each other so as to leave smooth non-embossed areas 8 therebetween. A smooth non-embossed area 8 is defined as an uninterrupted area of at least 1 cm$^2$, preferably at least 1.5 cm$^2$ and more preferably at least 2 cm$^2$ having no embossment sites thereon. According to another embodiment the embossing pattern comprises individual embossing sites located spaced from each other, wherein the spaces between the individual embossing sites form said non-embossed areas.

The pattern roll 14 and the printing roll 2 are synchronized so that said colorant is transferred at least mainly to the non-embossed areas 8 of the web in the selected printing pattern. The term "at least mainly" in this respect means that at least 50% of the printed area of said printing pattern 10 will be located on the non-embossed areas 8 of the web 1. According to the preferred embodiments at least 75% and more preferably at least 90% of the printed area of the printing pattern 10 is located on the smooth non-embossed portions 8 of the web. According to one embodiment substantially all printed area of the printing pattern 10 is located on the relatively smooth non-embossed portions 8 of the web.

Figure 2:
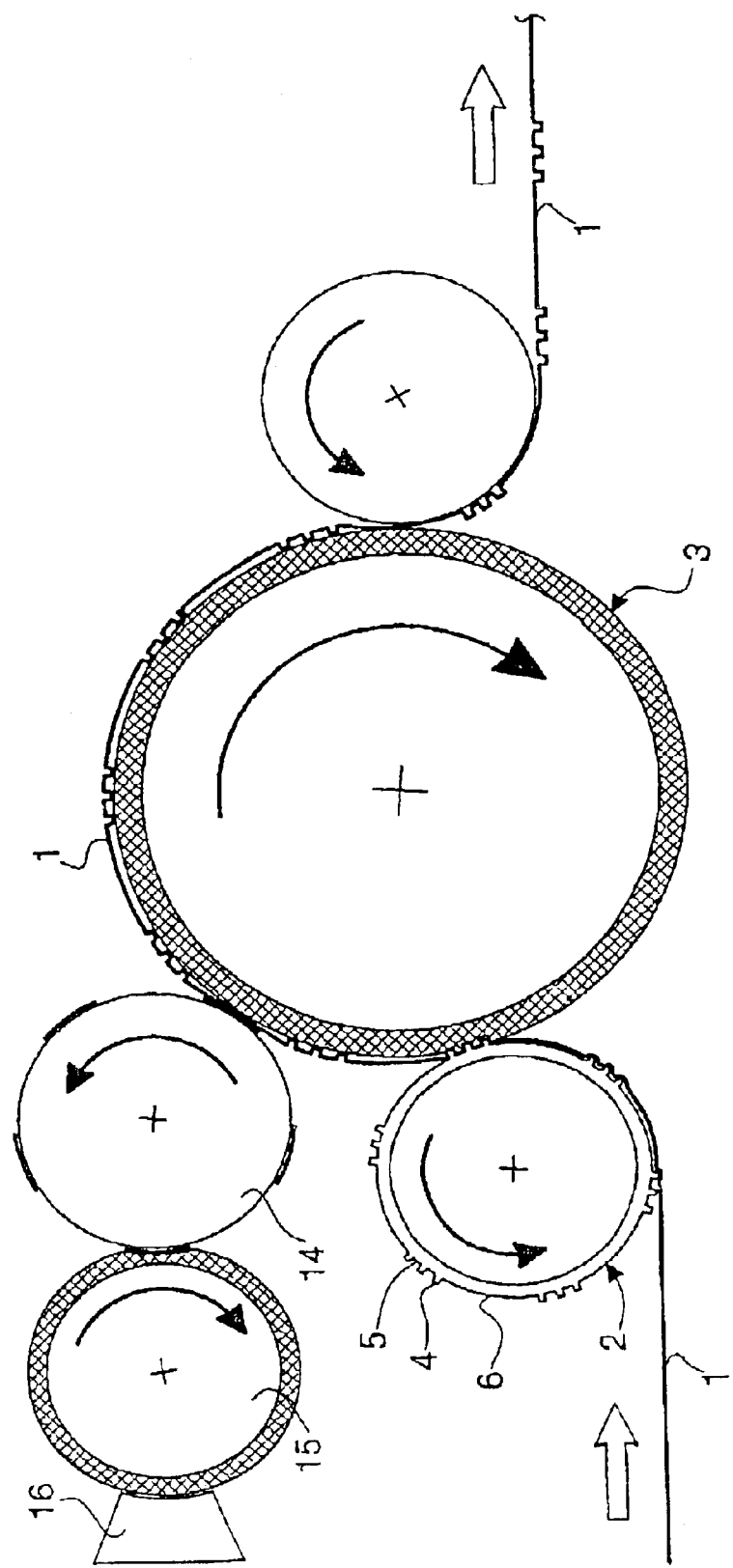
FIG. 2 is a side view corresponding to FIG. 1 but according to another embodiment.

According to an alternative embodiment shown in FIG. 2 the embossing and printing steps are reversed, so that the pattern or embossing roll 2 is located before the printing roll 14. Also in this case the pattern roll 2 and printing roll 14 are synchronized so that the colorant is transferred at least mainly to the non-embossed areas 8 of the web in the selected pattern.

The embossing and printing method and device according to the invention provides an improved printing quality since at least the main part of the printing pattern will be located on non-embossed areas of the web.

It is also encompassed by the present invention that the paper web 1 entering the embossing and printing stations at the pattern roll, the printing roll 14 and the impression roll 13 has been given a first printing basic pattern, for example over its entire surface and that the pattern provided by the printing roll 14 is an additional pattern.

The web 1 can after the embossing and printing undergo optional process steps such as lamination with additional plies, before converting into the final product.

What is claimed is:

1. Method for embossing and printing a web of flexible material selected from the group consisting of paper and nonwoven material, which comprises:

printing the web in a selected pattern by bringing it into a first nip between an impression roll and a printing roll carrying a colorant in a selected pattern; subsequently embossing the web by bringing it into a second nip between a pattern roll and said impression roll, said pattern roll having a three dimensional pattern of alternating raised and recessed portions, said three dimensional pattern being interrupted by relatively smooth areas, so that the web will be embossed in selected areas while leaving other areas substantially unembossed; said pattern roll and printing roll being synchronized so that embossing occurs mainly in the areas of the web that are not printed in said selected pattern.

2. Method for embossing and printing a web of flexible material selected from the group consisting of paper and nonwoven material, which comprises:

embossing the web by bringing it into a first nip between a pattern roll and an impression roll, said pattern roll having a three dimensional pattern of alternating raised and recessed portions, said three dimensional pattern being interrupted by relatively smooth areas, so that the web will be embossed in selected areas while leaving other areas substantially non-embossed;

subsequently bringing the web into a second nip between said impression roll and a printing roll carrying a colorant in a selected pattern, said pattern roll and printing roll being synchronized so that said colorant is transferred at least mainly to unembossed areas of the web in said selected pattern.

3. Method as claimed in claim 1, wherein the pattern roll is of harder material than the impression roll, which is of a non-rigid material, so that the three dimensional pattern on the pattern roll will cause temporary or permanent impressions in the surface of the impression roll.

4. Method as claimed in claim 1, wherein the impression roll is of a rigid material and has a three-dimensional pattern of alternating raised and recessed portions, said three dimensional pattern being interrupted by relatively smooth areas, the three-dimensional pattern on the impression roll matching to that of the pattern roll and the pattern roll and impression rolls are driven so that the alternating raised and recessed portions patterns thereon will match into each other and the relatively smooth areas will be facing each other.

5. Method as claimed in claim 2, wherein the nonembossed areas of the web entering the second nip will present raised areas with respect to the printing roll adapted to receive the colorant in said selected printing pattern.

6. Method as claimed in claim 1, wherein the synchronization of the pattern roll and the printing roll is such that at least 50% of the printed areas of said selecting printing pattern will be located on the non-embossed areas of the web.

7. Method as claimed in claim 6, wherein the synchronization of the pattern roll and the printing roll is such that at least 75% of the printed area of said selected printing pattern will be located on the smooth, non-embossed portions of the web.

8. Method as claimed in claim 7, wherein the synchronization of the pattern roll and the printing roll is such that substantially all printed area of said selected printing pattern will be located on the smooth non-embossed portions of the web.

9. Method as claimed in claim 1, further comprising synchronizing the pattern roll and the printing roll so as to arrange said selected embossed areas as groups of embossment sites spaced apart and leave substantially smooth and unembossed areas between said groups of embossment sites, wherein at least some of said smooth and unembossed areas have an uninterrupted surface area of at least 1 $cm^2$ having no embossment sites thereon.

10. Method as claimed in claim 9, wherein the synchronization of the pattern roll and the printing roll is such that at least some of said smooth and unembossed areas will have uninterrupted surface area of at least 1.5 $cm^2$ with no embossment sites thereon.

11. Method as claimed in claim 2, wherein the pattern roll is of harder material than the impression roll, which is of a non-rigid material, so that the three dimensional pattern on the pattern roll will cause temporary or permanent impressions in the surface of the impression roll.

12. Method as claimed in claim 2, wherein the impression roll is of a rigid material and has a three-dimensional pattern of alternating raised and recessed portions, said three dimensional pattern being interrupted by relatively smooth areas, the three-dimensional pattern on the impression roll matching to that of the pattern roll and the pattern roll and impression rolls are driven so that the alternating raised and recessed portions patterns thereon will match into each other and the relatively smooth areas will be facing each other.

* * * * *